(12) United States Patent
Reshef et al.

(10) Patent No.: US 12,050,439 B2
(45) Date of Patent: Jul. 30, 2024

(54) METHOD OF DECOUPLING TRAJECTORY PLANNING AND TRACKING

(71) Applicant: GM Global Technology Operations LLC, Detroit, MI (US)

(72) Inventors: Roi Reshef, Tel Aviv (IL); Avshalom Suissa, Ganei Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 17/510,616

(22) Filed: Oct. 26, 2021

(65) Prior Publication Data
US 2023/0127999 A1  Apr. 27, 2023

(51) Int. Cl.
*G05B 13/02* (2006.01)
*B60W 60/00* (2020.01)
*G05D 1/00* (2024.01)

(52) U.S. Cl.
CPC ......... *G05B 13/024* (2013.01); *G05D 1/0212* (2013.01); *B60W 60/001* (2020.02)

(58) Field of Classification Search
CPC ............... G05B 13/024; G05D 1/0212; G05D 2201/0213; B60W 60/001

USPC .......................................................... 701/26
See application file for complete search history.

(56) References Cited

U.S. PATENT DOCUMENTS

| | | | |
|---|---|---|---|
| 2015/0063628 A1* | 3/2015 | Bernal | G06V 20/52 382/103 |
| 2020/0035098 A1* | 1/2020 | Vozar | G08G 1/0116 |
| 2020/0117199 A1* | 4/2020 | Akella | G05D 1/0088 |
| 2021/0048817 A1* | 2/2021 | Olson | B60W 40/114 |
| 2022/0343531 A1* | 10/2022 | Huffman | G06T 7/38 |
| 2023/0191608 A1* | 6/2023 | Horowitz | B25J 9/163 700/245 |

* cited by examiner

*Primary Examiner* — Yazan A Soofi
(74) *Attorney, Agent, or Firm* — CANTOR COLBURN LLP

(57) ABSTRACT

A vehicle, and a system a method of navigating a vehicle. The system includes a trajectory planning module and a trajectory tracking module. The trajectory planning module operates at a processor of the vehicle to generate a trajectory for the vehicle. The trajectory tracking module operates at the processor to track the trajectory to navigate the vehicle. The trajectory planning module and the trajectory tracking module run asynchronously from each other.

20 Claims, 6 Drawing Sheets

METHOD OF DECOUPLING TRAJECTORY PLANNING AND TRACKING

INTRODUCTION

The subject disclosure relates to autonomous vehicles and, in particular, to a system and method for navigating autonomous vehicles using asynchronous trajectory planning and trajectory tracking.

Autonomous vehicles include modules or programs tasked for navigating the vehicle based on a planned trajectory. A single optimization problem is solved to both plan and track the trajectory. This approach generally introduces latency and system delay into the tracking process, which can allow for reliability issues to arise. Accordingly, it is desirable to provide a system and method for trajectory tracking that reduces these latency issues.

SUMMARY

In one exemplary embodiment a method of navigating a vehicle is disclosed. A trajectory for the vehicle is generated at a trajectory planning module running at a processor of the vehicle. The trajectory is tracked at a trajectory tracking module running at the processor to navigate the vehicle. The trajectory planning module and the trajectory tracking module run asynchronously from each other.

In addition to one or more of the features described herein, the trajectory planning module solves a first optimization problem to generate the trajectory and the trajectory tracking module solves a second optimization problem using the trajectory to generate an actuation signal for navigating the vehicle, the first optimization problem and the second optimization problem being solved asynchronously from each other. The method further includes one of running the trajectory planning module and the trajectory tracking module at different frequencies, and at least one of the trajectory planning module and the trajectory tracking module being event-driven. The method further includes adjusting a first frequency of the trajectory planning module with respect to a second frequency of the trajectory tracking module based on a state estimate provided from the trajectory tracking module to the trajectory planning module. The state estimate indicates an ability of the trajectory tracking module to track the trajectory. The method further includes receiving the trajectory at the trajectory tracking module, generating an updated trajectory based on a time difference between generation of the trajectory and receiving a localization message at the trajectory tracking module, and tracking the updated trajectory at the trajectory tracking module. The method further includes providing an anchor reference frame with the trajectory from the trajectory planning module to the trajectory tracking module.

In another exemplary embodiment, a system for navigating a vehicle is disclosed. The system includes a trajectory planning module and a trajectory tracking module. The trajectory planning module operates at a processor of the vehicle to generate a trajectory for the vehicle. The trajectory tracking module operates at the processor to track the trajectory to navigate the vehicle. The trajectory planning module and the trajectory tracking module run asynchronously from each other.

In addition to one or more of the features described herein, the trajectory planning module solves a first optimization problem to generate the trajectory and the trajectory tracking module solves a second optimization problem using the trajectory to generate an actuation signal for navigating the vehicle, the first optimization problem and the second optimization problem being solved asynchronously from each other. Various embodiments of the system include wherein one of the trajectory planning module and the trajectory tracking module run at different frequencies, and at least one of the trajectory planning module and the trajectory tracking module is event-driven. The trajectory planning module runs at a first frequency and the trajectory tracking module runs at a second frequency, and the trajectory planning module adjusts the first frequency based on a state estimate provided from the trajectory tracking module to the trajectory planning module. The state estimate indicates an ability of the trajectory tracking module to track the trajectory. The trajectory tracking module receives the trajectory, generates an updated trajectory based on a time difference between generation of the trajectory and receiving a localization message at the trajectory tracking module, and tracks the updated trajectory at the trajectory tracking module. The trajectory planning module provides an anchor reference frame with the trajectory to the trajectory tracking module.

In yet another exemplary embodiment, a vehicle is disclosed. The vehicle includes a trajectory planning module and a trajectory tracking module. The trajectory planning module operates at a processor of the vehicle to generate a trajectory for the vehicle. The trajectory tracking module operates at the processor to track the trajectory to navigate the vehicle. The trajectory planning module and the trajectory tracking module run asynchronously from each other.

In addition to one or more of the features described herein, the trajectory planning module solves a first optimization problem to generate the trajectory and the trajectory tracking module solves a second optimization problem using the trajectory to generate an actuation signal for navigating the vehicle, the first optimization problem and the second optimization problem being solved asynchronously from each other. Various embodiment of the vehicle include wherein one of the trajectory planning module and the trajectory tracking module run at different frequencies, and at least one of the trajectory planning module and the trajectory tracking module is event-driven. The trajectory planning module runs at a first frequency and the trajectory tracking module runs at a second frequency, and the trajectory planning module adjusts the first frequency based on a state estimate provided from the trajectory tracking module to the trajectory planning module, wherein the state estimate indicates an ability of the trajectory tracking module to track the trajectory. The trajectory tracking module receives the trajectory, generates an updated trajectory based on a time difference between generation of the trajectory and receiving a localization message at the trajectory tracking module, and tracks the updated trajectory at the trajectory tracking module. The trajectory planning module provides an anchor reference frame with the trajectory to the trajectory tracking module.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
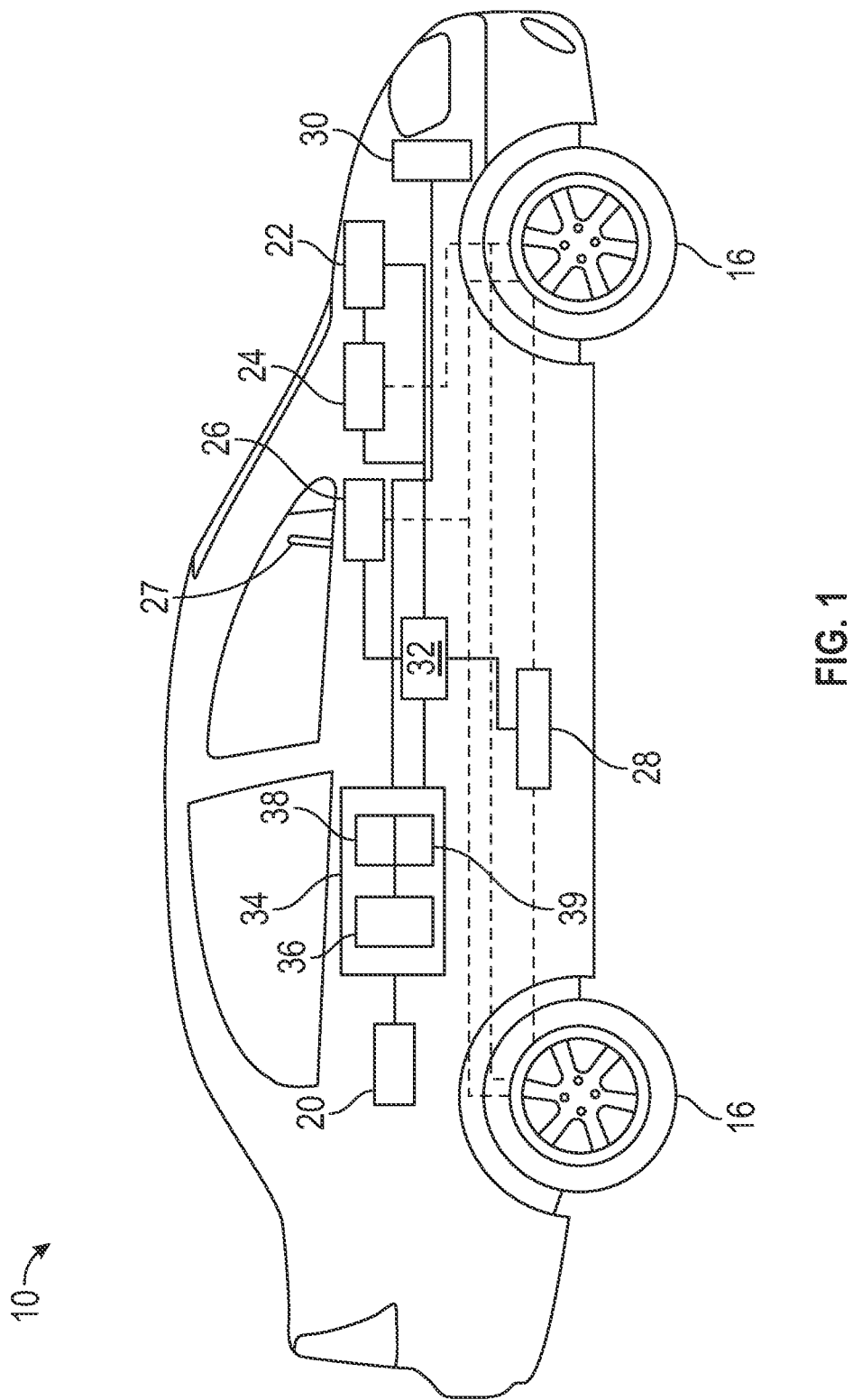
FIG. 1 shows an autonomous vehicle in accordance with an illustrative embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes devices for sensing objects in an exterior environment of the autonomous vehicle 10 and determines various parameters of the objects useful in locating the position and relative velocities of the objects with respect to the autonomous vehicle 10. Such parameters are provided to the controller 34. In various embodiments, the sensor system 30 includes one or more of a radar, Lidar, a digital camera, etc.

The controller 34 builds a trajectory for the autonomous vehicle 10 based on the output of sensor system 30 and determines an action at the vehicle for tracking the trajectory. The controller 34 can provide actuation signals to the actuator system 32 to control the propulsion system 22, transmission system 24, steering system 26, and/or brake system 28 in order to navigate the autonomous vehicle 10 based on the trajectory.

The controller 34 includes a processor 36 and a computer readable storage device or computer readable storage medium 38. The storage medium includes programs or instructions 39 that, when executed by the processor 36, operate the autonomous vehicle 10 based on sensor system outputs. The computer readable storage medium 38 may further include programs or instructions 39 that, when executed by the processor 36, build a trajectory for navigating the autonomous vehicle 10 through its environment and for tracking the trajectory to actuate a motion of the vehicle according to the trajectory.

Figure 2:
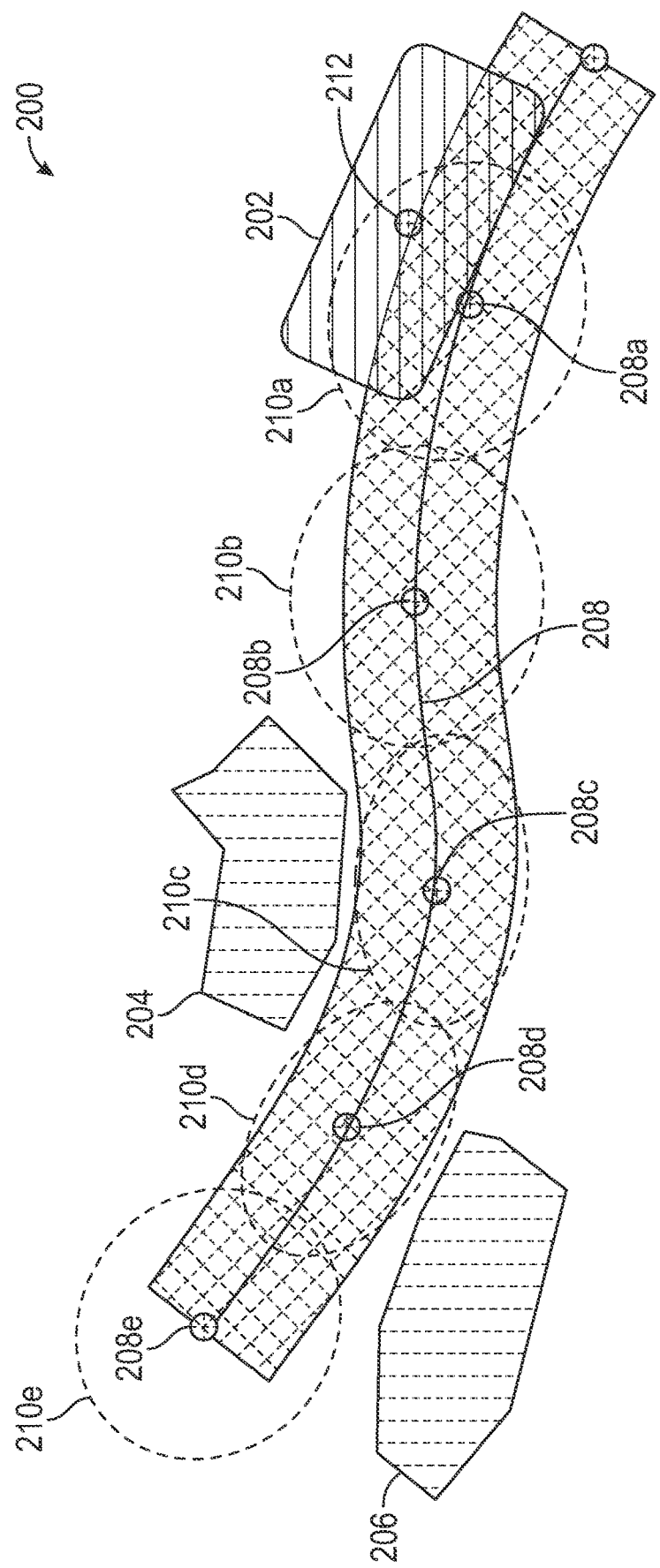
FIG. 2 shows a top view of an illustrative traffic condition through which the vehicle navigates.

FIG. 2 shows a top view 200 of an illustrative traffic condition through which the autonomous vehicle 10 navigates. The illustrative traffic condition includes a host vehicle 202 (such as the autonomous vehicle 10), a first object 204, and a second object 206. The host vehicle 202 plans a trajectory 208 that allows it to navigate safely between the first object 204 and the second object 206. The trajectory 208 includes of a plurality of trajectory points 208a, . . . , 208e. Each trajectory point 208a, . . . , 208e indicates an expected location for the host vehicle 202 at a given time as the host vehicle 202 travels along the trajectory 208. The host vehicle 202 follows the trajectory 208 by sequentially tracking each of the trajectory points 208a, . . . , 208e.

Each trajectory point 208a, . . . , 208e has an associated boundary region 210a, . . . , 210e indicating a general area for safe movement of the host vehicle 202. For a selected trajectory point, the vehicle moves safely when it is within the boundary region. The shape of the boundary region can be selected to accommodate the particular surroundings of its associated trajectory point and any limitations imposed by tracking errors of the expected trajectory. For example, the shape of the boundary region can be adjusted in order to prevent collision of the host vehicle 202 with either of the first object 204 and the second object 206 when the host vehicle 202 remains within the boundary region. As an illustrative example, boundary regions 210c and 210d are elliptical due to the presence of the first object 204 and the second object 206, while boundary regions 210a, 210b and 210e are more circular.

The host vehicle 202 tracks a given trajectory point by moving itself such that a vehicle point 212 representative of the host vehicle 202 passes as close to the trajectory point as possible. In a good tracking condition, vehicle point 212 either traverses the trajectory point or passes within its associated boundary region. Under poor tracking conditions, the vehicle point 212 may estimate that it will have to pass outside of the boundary region, given the current trajectory plan. The host vehicle 202 can generate a state estimate that indicates the ability of the host vehicle to track the trajectory point with respect to its boundary region. In various embodiments, the state estimate can be an error value indicating a minimum distance achieved between the vehicle point 212 and a trajectory point while tracking.

Figure 3:
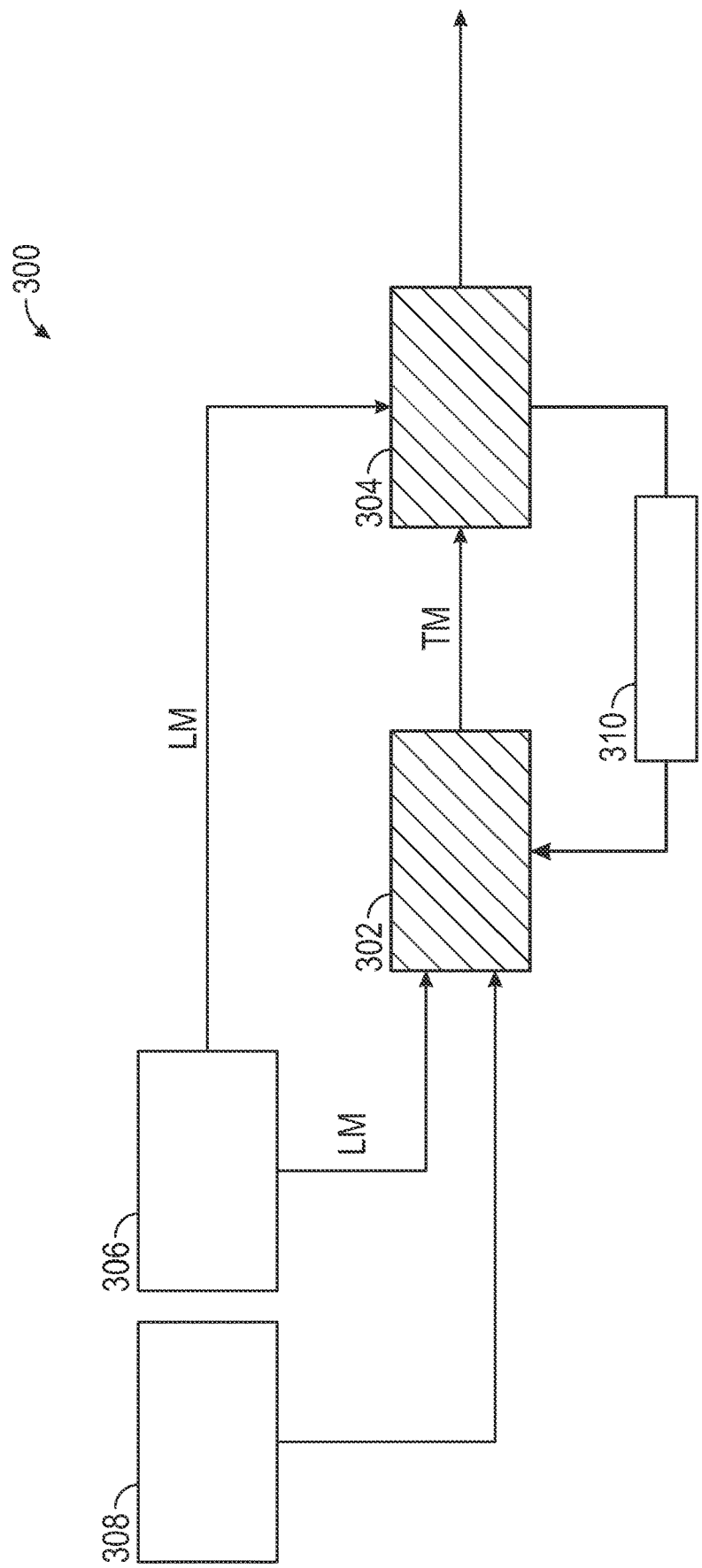
FIG. 3 shows a schematic diagram of a computational system for performing navigation of a host vehicle, in an illustrative embodiment.

FIG. 3 shows a schematic diagram of a computational system 300 for performing navigation of the host vehicle 202, in an illustrative embodiment. In various embodiments, the computational system 300 can be run on the processor 36 of the controller 34. The computational system 300 includes a trajectory planning module (also referred to herein as "TP module 302") and a trajectory tracking module (also referred to herein as "TT module 304"). The TP module 302 selects, creates, or generates a trajectory for the host vehicle 202 and the TT module 304 tracks the trajectory and generates an actuation signal for navigating the host vehicle 202. The actuation signal can be sent to the actuator system 32 to be implemented at the host vehicle 202. The actuation signal can be a steering signal, a velocity signal, an acceleration signal, a braking signal, etc.

The computational system 300 further includes a localization information buffer 306 and an environmental information buffer 308. The localization information buffer 306 provides a localization message (LM) regarding the local coordinates of the vehicle, which includes, but is not limited to, i.e., its pose (i.e., position, orientation), velocity, and acceleration within its environment. The environmental information buffer 308 provides environmental information which includes, but is not limited to, the locations and velocities of objects within the environment, the local speed limit, weather conditions, etc. The localization information buffer 306 can provide a localization message to both the TP module 302 and the TT module 304. The environmental information buffer 308 provides environmental information to the TP module 302.

The TP module 302 creates or generates the trajectory (including trajectory points and associated boundary regions) based on the localization message, the environmental information, and a goal or destination of the host vehicle 202. The localization message provides information about the host vehicle 202 necessary for the creation of a trajectory that is consistent with the current localization parameters of the host vehicle 202. The environmental information can provide information regarding objects in the environment, such as the first object 204 and the second object 206, thus helping define the locations for trajectory point and boundary regions. Additionally, the planned trajectory can consider the state of the host vehicle, such as whether a trailer is attached to the host vehicle.

The TP module 302 sends a trajectory message (TM) that includes the trajectory (i.e., trajectory points and associated boundary regions) to the TT module 304. The trajectory can be a discrete set of trajectory points and a discrete set of boundaries, wherein each trajectory point has an associated boundary. Alternatively, the trajectory can be a continuous trajectory and the boundary is a continuous boundary associated with the continuous trajectory. The trajectory is generated based on the environmental information and localization information. As discussed below the trajectory message can also include a time stamp indicating a time at which it is generated. As further discussed below, the trajectory message can also include an anchor reference frame that can be used at the TT module 304 to maintain a common reference frame between modules.

In an illustrative embodiment, the trajectory message includes at least the fields shown below or their projection within a different coordinate frame:

$$[T\, x_a \psi_a \{[t_p \dot{x}_p \dot{\psi}_p \ddot{x}_p \ddot{\psi}_p b_p]\}]$$

Where T is the time when the trajectory was planned, $x_a$ and $\psi_a$ are the position and orientation vectors of the anchor reference frame, respectively, {.} is a set of tuples and [.] is an ordered tuple of elements; $t_p$ is a future time of desired arrival at a point p, $x_p$ and $\Psi_p$ are the desired position an orientation vectors of the point p, $\dot{x}_p$, $\dot{\psi}_p$, $\ddot{x}_p$, and $\ddot{\psi}_p$ are first and second derivatives of the position and orientation at the point p, and $b_p$ is the boundary region.

The TT module 304 receives the trajectory message (TM) and tracks the trajectory to generate signals for moving the host vehicle 202 along the trajectory. The TP module 302 generates the trajectory by performing a first set of calculations, and the TT module 304 tracks the trajectory by performing a second set of calculations asynchronously from the first set of calculations. In particular, the TP module 302 generates the trajectory by solving a first optimization problem using the localization information, environmental information, and a known destination or goals. The TT module 304 solves a second optimization problem independently of the first optimization problem using the trajectory points, boundaries, and localization information to generate an actuation signal for the host vehicle 202. In various embodiments, the TT module 304 can adjust the gains or constraints of the second optimization problem for a selected tracking point to maintain the vehicle within the associated bound of the selected tracking point.

The TT module 304 also tracks a state estimate that indicates an ability of the TT module 304 to track or follow the trajectory provided from the TP module 302. The TT module 304 sends the state estimate to the TP module 302. The TP module 302 can adjust its a future planned trajectory to accommodate the TT module 304 based on the state estimate. The future planned trajectory can then be generated based on the environmental information, the localization information, and the latest state estimate of the TT module 304.

In various embodiments, the TP module 302 and the TT module 304 operate asynchronously. In other words, the TP module 302 and the TT module 304 operate simultaneously but at different rates. The TP module 302 can operate or run at a TP frequency or first frequency and the TT module 304 can operate or run at a TT frequency or second frequency, wherein the TP frequency and the TT frequency are different from each other. In general, the TP frequency is less than the TT frequency. The TP module 302 can adjust its planned trajectory or planning frequency based on the state estimate 310.

The TT module 304 can provide an up-to-date estimate of its tracking ability and send this estimate back to TP module 302 on a periodic basis. The TP module 302 then creates a collision-free trajectory that the TT module 304 is able to track. The trajectory is created based on the latest knowledge of tracking ability of the TT module 304. In various embodiment, the new trajectory can assume an entirely different shape. For example, the new trajectory can take the vehicle around obstacles instead of between them.

In addition, the TP module 302 and the TT module 304 can be asynchronous due to one or either or both modules being event driven. For example, the TP module 302 can initiate solving its first optimization problem when it receives new localization data and the TT module 304 can initiate solving its second optimization problem when it receives new localization data. Since the localization information can arrive at the TP module 302 and the TT module 304 at different times, the operation of the TP module 302 and the TT module 304 is asynchronous.

When modules are not event driven, the localization information may be consumed at the TP module 302 at the first frequency (Freq A or TP frequency) and is consumed at the TT module 304 at a second frequency (Freq B or TT frequency). The TP module 302 consumes the environmental information at a third frequency (Freq C). The TP module 302 outputs the trajectory (including boundary regions) to the TT module 304 at a fourth frequency (Freq D). The TT module 304 outputs an actuation signal to the actuator system 32 at a fifth frequency (Freq E) and sends the state estimate 310 to the TP module 302 at a sixth frequency (Freq F).

Figure 4:
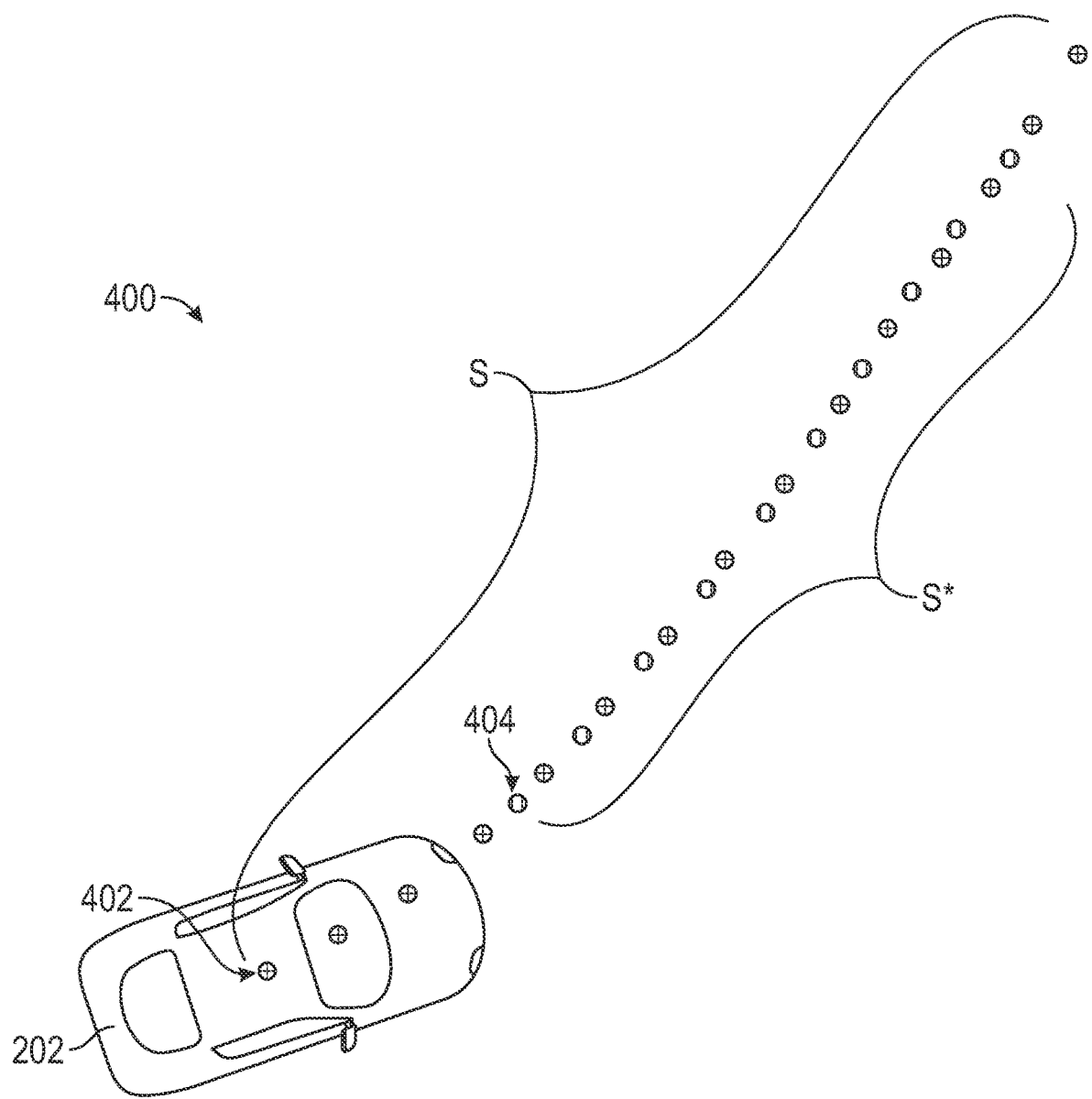
FIG. 4 illustrates an interpolation of trajectory points for different rates and/or offsets.

FIG. 4 illustrates an interpolation 400 of trajectory points at different rates and/or offsets. The first trajectory S is an original trajectory generated at the TP module 302. The second trajectory S* is an interpolated trajectory that is generated by the TT module 304 for tracking purposes. The second trajectory S* is derived from the first trajectory S and includes any delay between the receiving of information for tracking at the TT module with respect to the generation of the first trajectory S at the TP module 302, or any desired change in the frequency of points used for tracking.

Point 402 indicates a first trajectory point of the first trajectory S generated by the TT module 304. Point 402 is located at the actual position of the vehicle at the time of trajectory generation. However, the localization information may not arrive at the TT module 304 until a later time. Point 404 may indicate an interpolation of trajectory S at a first time relevant for tracking (i.e., at a time in which the localization information is received). The TT module 304 determines a difference between the time of trajectory generation and the time of receiving localization information at the TT module 304 and interpolates the trajectory points of the original trajectory via this difference in time to generate the second trajectory S*. The interpolation compensates for any time delay between generation of the trajectory and tracking of the trajectory. The second trajectory S* is the input into the second optimization problem at the TT module 304 for tracking.

Figure 5:
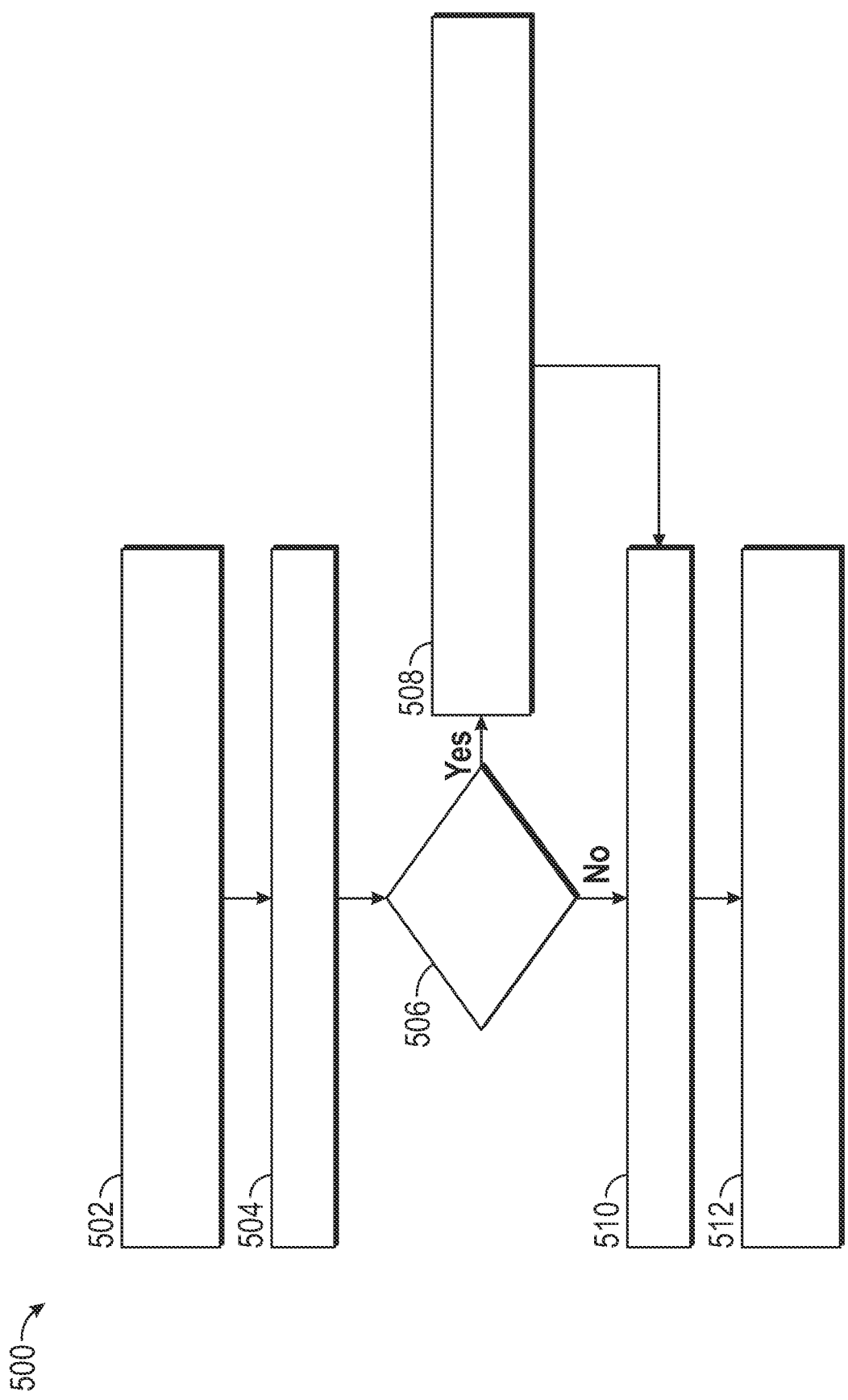
FIG. 5 shows a flowchart for trajectory tracking using the interpolated trajectory.

FIG. 5 shows a flowchart 500 for trajectory tracking using the interpolated trajectory S*. In box 502, a most recent trajectory message TM is pulled from the communication buffer of the TP module 302 and a most recent localization message LM is pulled from the localization information buffer 306.

In box 504, a time-alignment value t* is computed with respect to the most recent trajectory message TM and the most recent localization message LM, as shown in Eq. (1):

$$t^* = LM.t_0 - TM.t_0 \qquad (1)$$

where $LM.t_0$ to is the time of creation of the most recent localization message and $TM.t_0$ to is the time of creation of the most recent trajectory message. In box 506, if the first trajectory S is a set of discrete points, the method proceeds to box 508 in which a continuous reconstruction of the trajectory is made from the discrete points. The method then proceeds to box 510. Returning to box 506, if the first trajectory S is not a set of discrete points (i.e., the first trajectory S is continuous), the method proceeds directly to box 510. In box 510, the second trajectory S* is interpolated from the first trajectory S and the time delay, as shown in Eq. (2):

$$S^* = (s^*(t^*), s^*(t^* + d_r), s^*(t^* + 2d_r), \qquad (2)$$

where $s^*(t^*)$ is the interpolated trajectory point at $t^*$, $s^*(t^* + dt)$ is the interpolated trajectory point at $t^* + dt$, in which $d_r$ is the sampling resolution of the TT module 304, etc. In box 512, the trajectory tracking optimization problem is solved using the points of the second trajectory S*.

Figure 6:
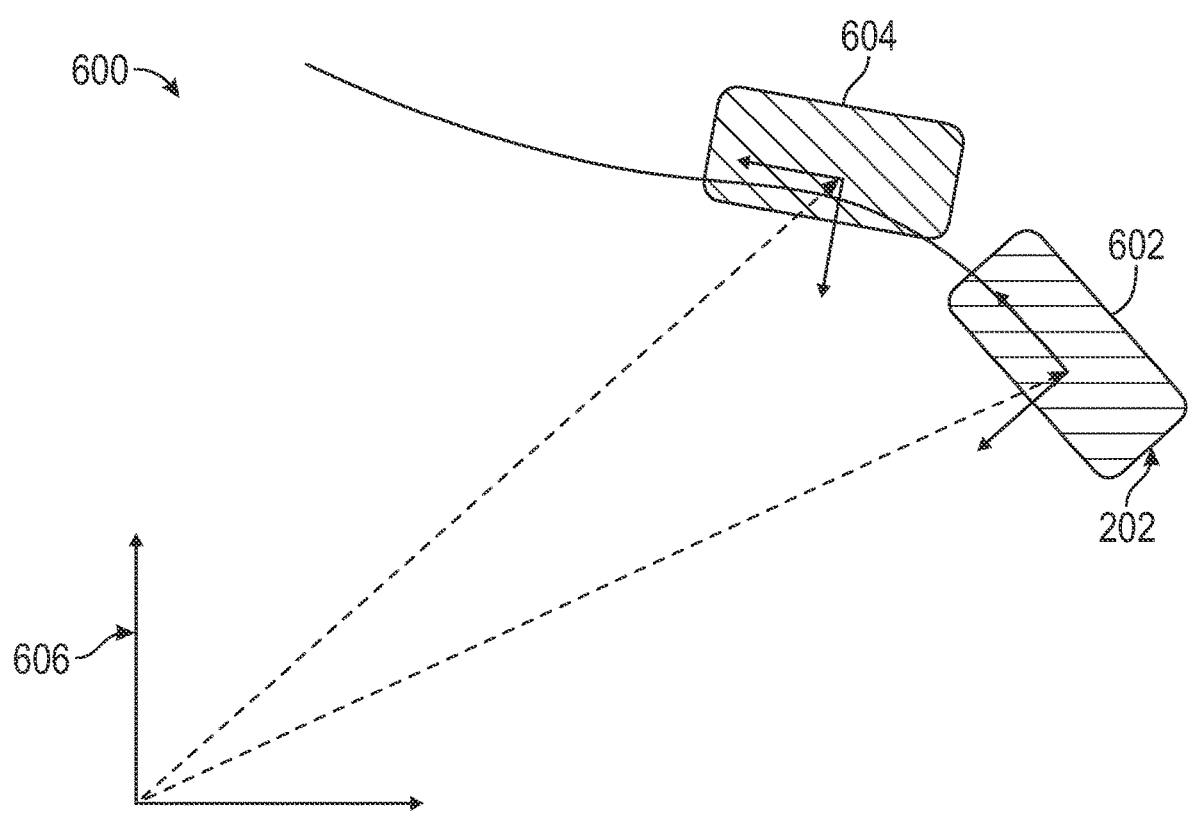
FIG. 6 shows a top view illustrating a host vehicle moving with respect to an anchor reference frame.

FIG. 6 shows a top view 600 illustrating a host vehicle 202 moving with respect to an anchor reference frame 606. The anchor reference frame 606 is a global reference frame accessible by both the TP module 302 and the TT module 304. First vehicle position 602 indicates a location of the host vehicle 202 at a time at which the trajectory is planned at the TP module 302. Second vehicle position 604 indicates a location of the host vehicle 202 at a later time t+ϵ at which the trajectory is tracked at the TT module 304.

Due to various delays, a first localization message received at the TP module 302 when the host vehicle 202 is at first vehicle position 602 can be different from a second localization message received at the TT module 304 when the host vehicle 202 is at second vehicle position 604. The TP module 302 generates both the trajectory and the anchor reference frame 606 using the first localization message and includes the trajectory and anchor reference frame in the trajectory message that is sent to the TT module 304. When the second localization message is received at the TT module 304 (i.e., when the host vehicle 202 is at second vehicle position 604), the TT module can refer to the anchor reference frame 606 to track the trajectory.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of navigating a vehicle, comprising:
   receiving a localization information of the vehicle at a trajectory planning module at a first frequency, the trajectory planning module running at a processor of the vehicle;
   generating a trajectory for the vehicle at the trajectory planning module based on the localization information;
   receiving the localization information at a trajectory tracking module at a second frequency, the trajectory tracking module running at the processor;
   receiving the trajectory from the trajectory planning module at the trajectory tracking module;
   tracking the trajectory at the trajectory tracking module running at the processor to control a motion of the vehicle to navigate the vehicle along the trajectory based on the localization information, wherein the trajectory planning module and the trajectory tracking module run asynchronously from each other;
   sending a state estimate of the trajectory tracking module from the trajectory tracking module to the trajectory planning module; and
   adjusting the first frequency of the trajectory planning module with respect to the second frequency of the trajectory tracking module based on the state estimate, wherein the state estimate indicates an ability of the trajectory tracking module to track the trajectory.

2. The method of claim 1, wherein the trajectory planning module solves a first optimization problem to generate the trajectory and the trajectory tracking module solves a second optimization problem using the trajectory to generate an actuation signal for navigating the vehicle, the first optimization problem and the second optimization problem being solved asynchronously from each other.

3. The method of claim 1, further comprising one of: (i) running the trajectory planning module and the trajectory tracking module at different frequencies; and (ii) at least one of the trajectory planning module and the trajectory tracking module being event-driven.

4. The method of claim 1, further comprising receiving the trajectory at the trajectory tracking module, generating an updated trajectory based on a time difference between generation of the trajectory and receiving a localization message at the trajectory tracking module, and tracking the updated trajectory at the trajectory tracking module.

5. The method of claim 1, further comprising providing an anchor reference frame with the trajectory from the trajectory planning module to the trajectory tracking module.

6. A system for navigating a vehicle, comprising:
a trajectory planning module operating at a processor of the vehicle, the trajectory planning module configured to receive a localization information of the vehicle at a first frequency and to generate a trajectory for the vehicle based on the localization information of the vehicle; and
a trajectory tracking module operating at the processor, the trajectory tracking module configured to receive the localization information at a second frequency, receive the trajectory from the trajectory planning module, and to track the trajectory to control a motion of the vehicle to navigate the vehicle along the trajectory based on the localization information and the trajectory, thereby generating an actuation signal for controlling a motion of the vehicle based on the trajectory, wherein the trajectory planning module and the trajectory tracking module run asynchronously from each other,
wherein the trajectory tracking module sends a state estimate of the trajectory tacking module to the trajectory planning module, the state estimate indicating an ability of the trajectory tracking module to track the trajectory and the trajectory planning module adjusts the first frequency with respect to the second frequency based on the state estimate.

7. The system of claim 6, wherein the trajectory planning module solves a first optimization problem to generate the trajectory and the trajectory tracking module solves a second optimization problem using the trajectory to generate an actuation signal for navigating the vehicle, the first optimization problem and the second optimization problem being solved asynchronously from each other.

8. The system of claim 6, wherein one of: (i) the trajectory planning module and the trajectory tracking module run at different frequencies; and (ii) at least one of the trajectory planning module and the trajectory tracking module is event-driven.

9. The system of claim 6, wherein the trajectory tracking module receives the trajectory, generates an updated trajectory based on a time difference between generation of the trajectory and receiving a localization message at the trajectory tracking module, and tracks the updated trajectory at the trajectory tracking module.

10. The system of claim 6, wherein the trajectory planning module provides an anchor reference frame with the trajectory to the trajectory tracking module.

11. A vehicle, comprising:
a trajectory planning module operating at a processor of the vehicle, the trajectory planning module configured to receive a localization information of the vehicle at a first frequency and to generate a trajectory for the vehicle based on localization information; and
a trajectory tracking module operating at the processor, the trajectory tracking module configured to receive the localization information at a second frequency, receive the trajectory from the trajectory planning module, and to track the trajectory to control a motion of the vehicle to navigate the vehicle along the trajectory based on the localization information and the trajectory, thereby generating an actuation signal for controlling a motion of the vehicle based on the trajectory, wherein the trajectory planning module and the trajectory tracking module run asynchronously from each other,
wherein the trajectory tracking module sends a state estimate of the trajectory tacking module to the trajectory planning module, the state estimate indicating an ability of the trajectory tracking module to track the trajectory and the trajectory planning module adjusts the first frequency with respect to the second frequency based on the state estimate.

12. The vehicle of claim 11, wherein the trajectory planning module solves a first optimization problem to generate the trajectory and the trajectory tracking module solves a second optimization problem using the trajectory to generate an actuation signal for navigating the vehicle, the first optimization problem and the second optimization problem being solved asynchronously from each other.

13. The vehicle of claim 11, wherein one of: (i) the trajectory planning module and the trajectory tracking module run at different frequencies; and (ii) at least one of the trajectory planning module and the trajectory tracking module is event-driven.

14. The vehicle of claim 11, wherein the trajectory tracking module receives the trajectory, generates an updated trajectory based on a time difference between generation of the trajectory and receiving a localization message at the trajectory tracking module, and tracks the updated trajectory at the trajectory tracking module.

15. The vehicle of claim 14, wherein the trajectory planning module provides an anchor reference frame with the trajectory to the trajectory tracking module.

16. The method of claim 1, further comprising sending a trajectory from the trajectory planning module to the trajectory tracking module at a third frequency.

17. The method of claim 16, further comprising sending the state estimate at a fourth frequency.

18. The system of claim 6, wherein the trajectory planning module sends the trajectory to the trajectory tracking module at a third frequency.

19. The system of claim 18, wherein the trajectory tracking module sends the state estimate to the trajectory planning module at a fourth frequency.

20. The vehicle of claim 11, wherein the trajectory planning module sends the trajectory to the trajectory tracking module at a third frequency and the trajectory tracking module sends the state estimate to the trajectory planning module at a fourth frequency.

* * * * *